Dec. 3, 1957  J. BARCAFER  2,815,225
TRAILER HITCH WITH AUXILIARY SAFETY DEVICE
Filed March 14, 1956
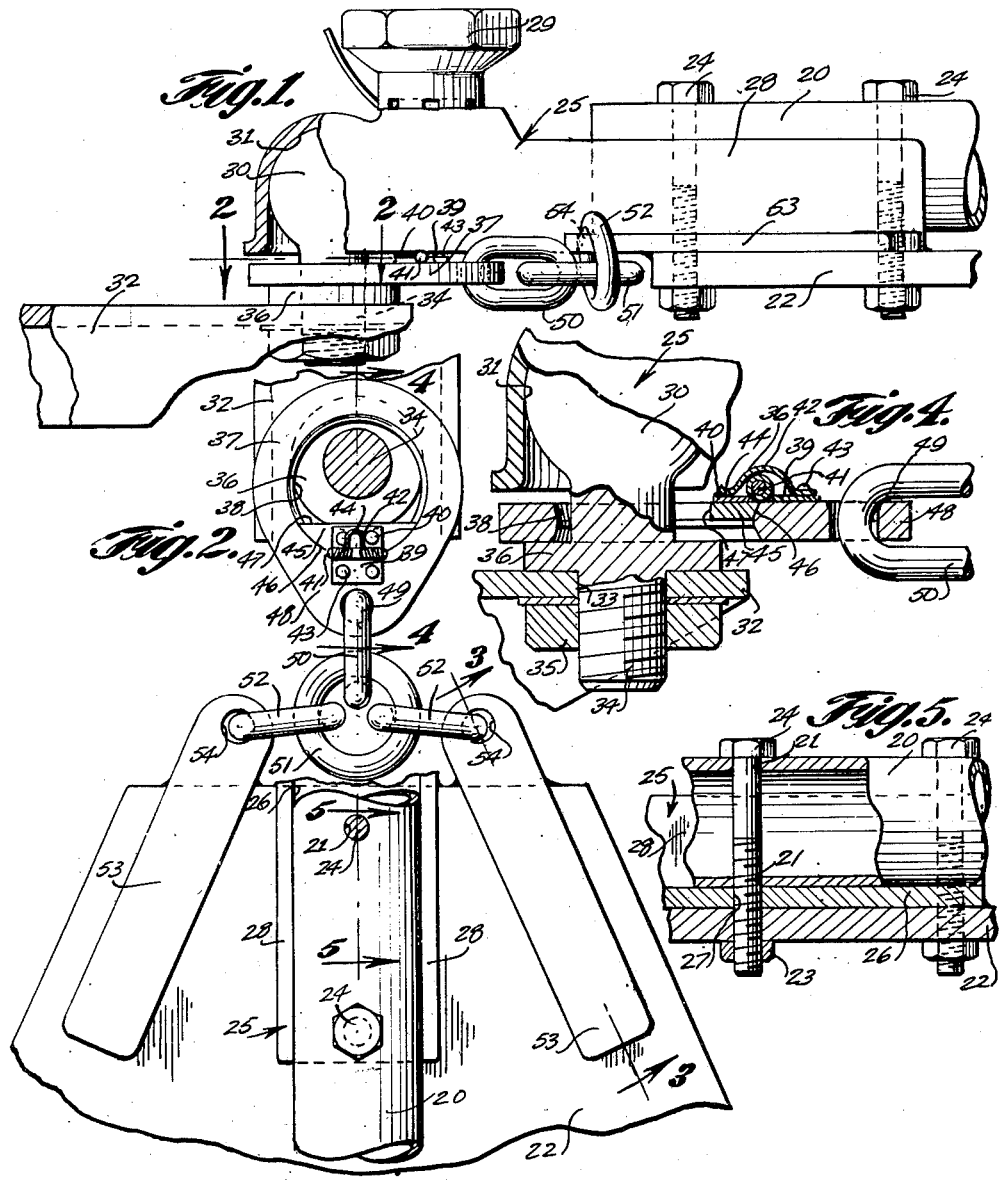
INVENTOR.
John Barcafer
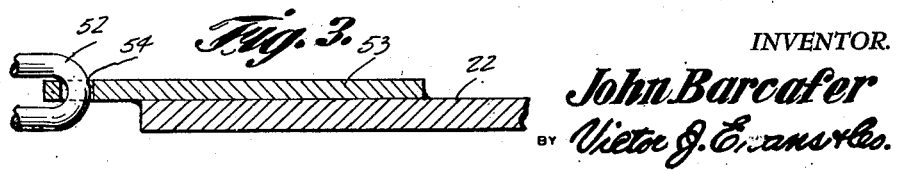
ATTORNEYS

United States Patent Office 2,815,225
Patented Dec. 3, 1957

2,815,225

TRAILER HITCH WITH AUXILIARY SAFETY DEVICE

John Barcafer, Shattuck, Okla.

Application March 14, 1956, Serial No. 571,389

4 Claims. (Cl. 280—457)

This invention relates to a trailer hitch for coupling a trailer to a towing vehicle, such as an automobile or truck, and more particularly to a safety chain for use between a towing vehicle and trailer.

This invention is an improvement over the safety chain shown and described in my copending application Serial No. 476,799, filed December 21, 1954.

The object of the invention is to provide a safety chain which has increased strength and ruggedness, so that in the event the trailer hitch accidentally breaks, the trailer will remain coupled or connected to the towing vehicle.

Another object of the invention is to provide a safety chain which includes an improved spring arrangement for retaining the chain connected to the drawbar of the vehicle, there being a construction provided which permits the safety chain to be used with a plurality of different sizes of trailer hitches.

A further object of the invention is to provide a safety chain which is extremely simple and inexpensive to manufacture, and which is ruggedly constructed so that it will not readily get out of order.

Other objects and advantages will be apparent during the course of the following description.

In the accompanying drawings forming a part of this application, and in which like numerals are used to indicate like parts throughout the same:

Figure 1 is a side elevational view of the trailer hitch, showing the safety chain connected thereto, and with parts broken away and in section;

Figure 2 is a sectional view taken on the line 2—2 of Figure 1;

Figure 3 is a sectional view taken on the line 3—3 of Figure 2;

Figure 4 is a sectional view taken on the line 4—4 of Figure 2;

Figure 5 is a sectional view taken on the line 5—5 of Figure 2.

Referring in detail to the drawings, the numeral 20 designates a tongue, which may be a cylindrical shape tongue, and the tongue 20 is provided with a plurality of spaced apart apertures 21, Figure 5. There is further provided a plate 22 which may be secured to the trailer being towed and the plate 22 is provided with a plurality of apertures 23 which register with the apertures 21 in the tongue 20. Bolts 24 extend through these registering apertures, and the bolts 24 may have nuts arranged in threaded engagement with the lower ends thereof.

The numeral 25 designates a head which includes a bottom wall 26 which is provided with apertures 27 through which the bolts 24 extend, the bottom wall 26 being interposed between the tongue 20 and the plate 22. The head 25 further includes a pair of upstanding side walls 28 which extend upwardly on opposite side of the tongue 20.

A locking mechanism 29 is arranged on the head 25 for retaining a ball 30 in the socket 31 which is formed in the head 25. The numeral 32 designates a drawbar which may extend rearwardly from the towing vehicle, such as the automobile or truck, and the drawbar 32 is provided with an opening 33 through which extends a shank 34 that has a lower externally threaded portion. A nut 35 may be arranged in threaded engagement with the portion 34, and a circular flange or shoulder 36 may be formed on the shank 34 above the top of the drawbar 32. The ball 30 is secured to or formed integral with the upper end of the shank 34.

There is further provided a bracket 37 which is provided with an opening or aperture 38 through which extends a portion of the shank 34, and a first hinge plate 39 is secured to the upper surface of the bracket 37 in any suitable manner, as for example, by means of securing elements 43. A second hinge plate 40 is pivotally or hingedly connected to the first hinge plate 39 through the medium of a pintle 41, and a spring member 42 has one end secured to the upper surface of the first hinge plate 39. The spring member 42 includes a curved portion 44 which engages the second hinge plate 40.

Secured to the under surface of the second hinge plate 40 in any suitable manner, as for example by welding, is a lug or plug 45, and the plug 45 is mounted for movement into and out of engagement with a portion of the opening 38 in the bracket 37. The lug 45 includes a curved surface 46 which conforms to the configuration of a portion of the opening 38, and the lug 45 further includes a flat edge surface 47 which is arranged adjacent the portion of the shank 34.

The bracket 37 is provided with an enlarged portion 48 which is provided with an opening 49, and a link 50 is arranged in engagement with the opening 49. A ring 51 is connected to the link 50, and a pair of rings or links 52 extend from the ring 51. There is further provided a pair of bars 53 which have end portions thereof extending beyond the plate 22, and the end portions of the bar 53 are provided with openings 54 which have the links 52 arranged in engagement therewith.

From the foregoing, it is apparent that there has been provided a safety chain for use in a trailer hitch wherein the safety chain is an improvement over the safety chain shown and described in my copending application, Serial No. 476,799. In use, the drawbar 32 may extend rearwardly from a towing vehicle, such as an automobile or truck, and the plate 22 may be secured to the front of a trailer or the like. The tongue 20, head 25 and associated parts may be conected together by means of the bolts 24. The pair of bars 53 are secured to the upper surface of the plate 22 in any suitable manner, as for example by welding, and the bars 53 are arranged angularly with respect to each other. The bars 53 have their ends projecting beyond the end of the plate 22, and the openings 54 in the bars 53 receive the links 52, the pair of links 52 being connected to the ring 51. The link 50 is connected to the ring 51, and the link 50 engages the opening 49 in the enlarged portion 48 of the bracket 37. The bracket 37 includes the lug 45 which is normally maintained in registry with a portion of the opening 38 by means of the spring 42. Thus, the spring pressed lug 45 prevents accidental disengagement of the bracket 37 from the shank 34. However, when the lug 45 is being raised up, as when the bracket 37 is to be removed from the shank 34, the lug 45 can be pivoted against the spring member 42, so as to permit movement of the lug 45, whereby the bracket can be removed from the shank, as when the trailer and automobile or truck are being disconnected.

Ordinarily, the trailer hitch functions so that the automobile or truck tows the trailer therebehind, but in the event that the trailer hitch breaks, then the mechanism of the present invention will still maintain the trailer coupled to the towing vehicle. Thus, the safety chain mechanism of the present invention includes the bracket 37, link 50, spring 51, link 52, as well as the bar 53 and the associated parts.

Thus, it will be seen that there has been provided a life guard safety chain which can be made of any suitable material and of any desired size. The angular arrangement of the pair of bars 53 permits the mechanism to be adapted to trailer tongues of different shapes and sizes.

The spring hinge arrangement, together with the lugs 45, insures that the device will remain attached properly and different sizes of shanks can be accommodated.

I claim:

1. In a trailer hitch, a cylindrical pipe tongue provided with a plurality of spaced apart apertures, a horizontally disposed plate arranged below said tongue and provided with a plurality of apertures registering with the apertures in said tongue, a head including a U-shaped portion provided with a bottom wall interposed between said tongue and plate, and said bottom wall being provided with a plurality of spaced apart apertures registering with the apertures in said tongue and plate, said head further including a pair of spaced parallel side walls extending upwardly on opposite sides of said tongue, a locking mechanism on said head, said head being provided with a socket therein, a drawbar provided with an opening therein, a shank extending through said opening and including a lower exteriorly threaded portion, a securing element arranged in engagement with the lower exteriorly threaded portion of said shank, an annular flange on said shank arranged above said drawbar, a ball on the upper end of said shank seated in said socket, a bracket provided with a circular opening for the projection therethrough of said shank, a first hinge plate secured to the upper surface of said bracket, a second hinge plate pivotally connected to said first hinge plate, a lug secured to said second hinge plate and mounted for movement into and out of engagement with a portion of the opening in said bracket, said bracket further including an enlarged portion provided with an opening, a first link arranged in engagement with said last-named opening, a second link connected to said first link, a third and fourth link connected to said second link, a pair of bars arranged on opposite sides of said tongue and having their lower surfaces secured to the upper surface of said plate, the ends of said bars projecting beyond said plate and provided with openings engaging said third and fourth links, said bars being arranged angularly with respect to each other.

2. In a trailer hitch, a cylindrical pipe tongue provided with a plurality of spaced apart apertures, a horizontally disposed plate arranged below said tongue and provided with a plurality of apertures registering with the apertures in said tongue, a head including a U-shaped portion provided with a bottom wall interposed between said tongue and plate, and said bottom wall being provided with a plurality of spaced apart apertures registering with the apertures in said tongue and plate, said head further including a pair of spaced parallel side walls extending upwardly on opposite sides of said tongue, a locking mechanism on said head, said head being provided with a socket therein, a drawbar provided with an opening therein, a shank extending through said opening and including a lower exteriorly threaded portion, a securing element arranged in engagement with the lower exteriorly threaded portion of said shank, an annular flange on said shank arranged above said drawbar, a ball on the upper end of said shank seated in said socket, a bracket provided with a circular opening for the projection therethrough of said shank, a first hinge plate secured to the upper surface of said bracket, a second hinge plate pivotally connected to said first hinge plate, a lug secured to said second hinge plate and mounted for movement into and out of engagement with a portion of the opening in said bracket, said bracket further including an enlarged portion provided with an opening, a first link arranged in engagement with said last-named opening, a second link connected to said first link, a third and fourth link connected to said second link, a pair of bars arranged on opposite sides of said tongue and having their lower surfaces secured to the upper surface of said plate, the ends of said bars projecting beyond said plate and provided with openings engaging said third and fourth links, said bars being arranged angularly with respect to each other, said lug having a curved surface conforming to the configuration of a portion of the opening in said bracket, and said lug further including a flat end surface arranged contiguously to said shank.

3. In a trailer hitch, a cylindrical pipe tongue provided with a plurality of spaced apart apertures, a horizontally disposed plate arranged below said tongue and provided with a plurality of apertures registering with the apertures in said tongue, a head including a U-shaped portion provided with a bottom wall interposed between said tongue and plate, and said bottom wall being provided with a plurality of spaced apart apertures registering with the apertures in said tongue and plate, said head further including a pair of spaced parallel side walls extending upwardly on opposite sides of said tongue, a locking mechanism in said head, said head being provided with a socket therein, a drawbar provided with an opening therein, a shank extending through said opening and including a lower exteriorly threaded portion, a securing element arranged in engagement with the lower exteriorly threaded portion of said shank, an annular flange on said shank arranged above said drawbar, a ball on the upper end of said shank seated in said socket, a bracket provided with a circular opening for the projection therethrough of said shank, a first hinge plate secured to the upper surface of said bracket, a second hinge plate pivotally connected to said first hinge plate, a lug secured to said second hinge plate and mounted for movement into and out of engagement with a portion of the opening in said bracket, said bracket further including an enlarged portion provided with an opening, a first link arranged in engagement with said last-named opening, a second link connected to said first link, a third and fourth link connected to said second link, a pair of bars arranged on opposite sides of said tongue and having their lower surfaces secured to the upper surface of said plate, the ends of said bars projecting beyond said plate and provided with openings engaging said third and fourth links, said bars being arranged angularly with respect to each other, said lug having a curved surface conforming to the configuration of a portion of the opening in said bracket, and said lug further including a flat end surface arranged contiguously to said shank, and a spring having one end secured to said first hinge plate and its other end abutting said second hinge plate.

4. In a trailer hitch, a pipe tongue provided with a plurality of spaced apart apertures, a plate arranged below said tongue and provided with a plurality of apertures registering with the apertures in said tongue, a head including a portion provided with a bottom wall interposed between said tongue and plate, said bottom wall being provided with a plurality of apertures registering with the apertures in said tongue and plate, said head further including a pair of side walls extending upwardly on opposite sides of said tongue, a locking mechanism on said head, said head being provided with a socket therein, a drawbar provided with an opening therein, a shank extending through said opening and including a lower exteriorly threaded portion, a securing element arranged in engagement with the lower exteriorly threaded portion of said shank, a flange on said shank arranged above said drawbar, a ball on said shank seated in said socket, a bracket provided with an opening for the projection therethrough of said shank, a first hinge plate secured to said bracket, a second hinge plate pivotally connected to said first hinge plate, a lug secured to said second hinge plate and mounted for movement into and out of engagement with a portion of the opening in said bracket, said bracket further including an enlarged portion provided with an opening, a first link arranged in engagement with said last-named opening, a second link connected to said first link, a third and fourth link connected to said second link, a pair of bars arranged on opposite sides of said tongue and secured to the upper surface of said plate, the ends of said bars projecting beyond said plate and provided with openings engaging said third and fourth links.

References Cited in the file of this patent

UNITED STATES PATENTS

| | | |
|---|---|---|
| 1,636,295 | Dempsey | July 19, 1927 |
| 2,515,856 | Broughs | July 18, 1950 |

FOREIGN PATENTS

| | | |
|---|---|---|
| 8,985/32 | Australia | Aug. 28, 1933 |